Patented Oct. 28, 1952

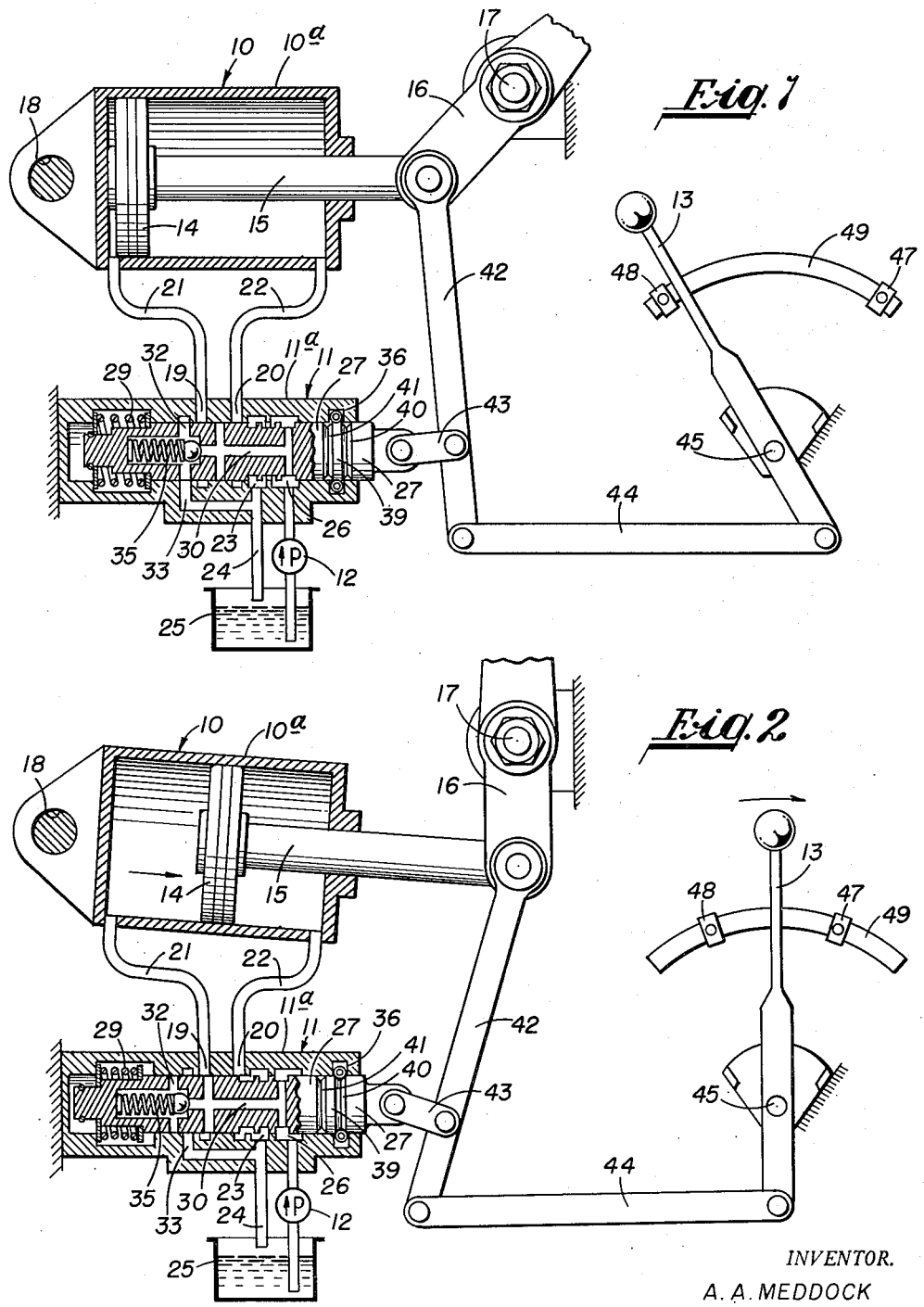

2,615,432

UNITED STATES PATENT OFFICE 2,615,432

HYDRAULIC CONTROL SYSTEM WITH AUTOMATIC STOP

Alvin A. Meddock, Van Nuys, Calif., assignor to Bendix Aviation Corporation, South Bend, Ind., a corporation of Delaware Application March 27, 1950, Serial No. 152,168

4 Claims. (Cl. 121—41)

This invention relates to hydraulic control systems in which a driven element is moved into a desired position by hydraulic power under control of a manually actuated handle or the like.

An object of the invention is to provide a simple and practicable hydraulic control system.

Another object is to provide a simple and practicable hydraulic control system in which movement of the driven element is initiated by displacing a handle, and is automatically terminated after the element has moved into a desired position for which the mechanism was preset.

Another object is to provide a system as last described in which the mechanism is preset by adjustments on the handle.

Other more specific objects and features of the invention will become apparent from the description to follow.

The invention relates to that known type of hydraulic system employing follow-up, in which movement of a control handle opens the selector valve to cause corresponding movement of the hydraulic motor, and movement of the motor closes the selector valve. However, the present invention differs from previous systems in two respects: (a) the selector valve has a detent for retaining it in open position so that the follow-up mechanism causes the handle to advance in synchronism with the motor instead of immediately closing the valve; (b) stops are provided on the handle for positively limiting its range of movement, so that when the handle reaches the stop the motor movement is applied to the valve to overcome the detent and close the valve.

The present system is particularly useful in hydraulic systems for farm tractors and the like in which it is frequently desired to hydraulically actuate an implement through a predetermined range of motion. The stops on the handle can be set to provide the desired range of movement, and the operator has merely to initiate the action by starting the handle in the direction of desired movement. The movement will then continue automatically without attention on the part of the operator until the handle reaches the other end of its range of movement and is stopped, to thereby force the final movement of the motor to close the valve. A further important advantage is that since the adjustable stops for determining the range of movement are mounted on the handle, which is adjacent the operator's position, change of the range is greatly facilitated, the operator being able to make the desired adjustment without leaving his seat.

The invention will now be explained by describing a particular embodiment thereof as illustrated in the drawing, in which:

Fig. 1 is a schematic diagram of a hydraulic system incorporating the invention; and Fig. 2 is a schematic diagram similar to Fig. 1 but showing the elements of the apparatus in a different position of operation.

Referring to Fig. 1, the system therein disclosed comprises a motor cylinder 10, a valve 11, a pump 12, and a control handle 13.

The motor 10 is shown as comprising a cylinder 10a having a piston 14 therein connected to a piston rod 15 which extends through one end of the cylinder and is connected to an arm 16 which is fulcrumed at 17 and extends to a device to be actuated. The cylinder 10a is adapted to be pivotally anchored to a stationary support by means of an eye 18 provided thereon which permits rocking movement of the cylinder 10a as the arm 16 swings about its fulcrum 17.

The valve 11 is a selector valve of the 4-way type having a body 11a containing ports 19 and 20 connected by lines 21 and 22 respectively to the opposite ends of the motor cylinder 10a, an exhaust port 23 adapted to deliver exhaust fluid through a pipe 24 to a reservoir 25, and a port 26 connected to the output of the pump 12 which draws fluid from the reservoir 25. The valve 11 contains a piston 27 with annular grooves thereon so positioned as to connect the two motor ports 19 and 20 and the exhaust port 23 and the pressure port 26 in a desired manner. The piston 27 is normally maintained in a neutral position, as shown in Fig. 1, by a centering spring 29 of conventional design, in which position both of the motor ports 19 and 20 are blocked and the pressure port 26 is connected to the exhaust port 23. If the piston 27 is shifted to the left, as shown in Fig. 2, the pressure port 26 is disconnected from the exhaust port 23 and is connected through a passage 30 in the piston to the motor port 19, to deliver pressure fluid to the left end of the motor cylinder 10a; at the same time, the right end of the cylinder 10a is connected through the line 22 and the motor port 20 to the exhaust port 23, so that the motor piston is moved to the right. On the other hand, if the valve piston 27 is moved from neutral position, as shown in Fig. 1, to the right, direct flow of pressure fluid from the pressure port 26 to the exhaust port 23 is blocked, pressure fluid is supplied through the passage 30 through the motor port 20 to the right end of the motor cylinder 10a, and fluid is exhausted from the left end of the motor cylinder through the line 21, the motor port 19, and through a passage 32 in the valve piston 27, and a passage 33 in the valve body, back to the exhaust line 24. A relief valve 35 may be built into the valve piston 27 to open in the event excessive pressure should be built up within the valve during its movement, or while it is in open position, that is, while the pressure port 26 is not connected to the exhaust port 23.

A detent mechanism is provided for holding the valve piston 27 in either open position against the restoring force constantly exerted on the piston by the restoring spring 29. As shown, this detent mechanism comprises an annular spring, sometimes referred to as a garter spring, 36, which is positioned in an annular groove in the valve body 11a and constricts about the piston 27. When the piston is in the neutral position as shown in Fig. 1, the spring 36 rests against a smooth cylindrical portion 39 of the piston, so that it has relatively little controlling effect on the piston. However, if the piston is moved into its left end, open position, as shown in Fig. 2, the garter spring 36 snaps into a V-shaped groove 40 in the piston and prevents restoration of the piston to neutral position by the restoring spring 29. On the other hand, if the valve piston 27 is moved to the right into its opposite open position, the garter spring 36 snaps into a second V-shaped annular groove 41 and holds the piston in that position.

In accordance with the present invention, the motor 10, the valve 11, and the handle 13 are interconnected by a differential mechanism whereby motion of any one of the three elements produces motion of that one of the other two elements that moves most easily. As shown, this mechanism includes a lever arm 42 which is pivotally connected at its upper end to the motor piston rod 15, is pivotally connected intermediate its ends by a link 43 to the valve piston 27, and is pivotally connected at its lower end by a link 44 to the lower end of the handle 13, the latter constituting a lever fulcrumed on a pin 45 for swinging movement through an arcuate path.

The mechanism operates as follows:

In general, the position of the handle 13 within its arc of movement corresponds to the position of the motor piston 14; thus in Fig. 1 both the motor piston 14 and the handle 13 are near their left limit positions. Now let it be assumed that the motor piston 14 is to be moved to the right a predetermined distance corresponding to the setting of a stop element 47 which is adjustable along a quadrant 49 associated with the handle 13. The operator gives the handle 13 a push to the right and releases it. This movement of the handle is applied through the link 44 to the lower end of the lever arm 42. The upper end of the lever arm cannot move, because it is pivotally connected to the motor piston rod 15, which has substantial resistance to movement. Therefore, the arm 42 moves clockwise about its upper end to shift the valve piston 27 into its leftmost position, as shown in Fig. 2, and the garter spring 36 snaps into the groove 40 and retains the valve piston in this position, in which pressure fluid is delivered to the left end of the motor cylinder 10a, and is exhausted from the right end, to move the motor piston 14 and the motor piston rod 15 to the right. The resultant movement of the upper end of the arm 42 applies a force tending to restore the valve piston 27 to neutral position, and tending to move the handle 13 to the right. The garter spring 36 applies a greater resistance to motion of the valve piston than the resistance of the handle 13 to movement, so that the latter moves in synchronism with the movement of the motor piston 14 until it encounters the stop 47, whereupon it is stopped. Thereafter, the continuing movement to the right of the upper end of the arm 42 causes the latter to swing about its lower end, and apply sufficient force to the valve piston 27 to move the latter back toward neutral position, overcoming the resistance to such movement afforded by the garter spring 36 in the groove 40. As soon as the groove 40 moves out of engagement with the garter spring, the centering spring 29 completes the movement of the valve piston back to neutral, thereby stopping the motor piston in the desired position.

When the operator wishes to return the motor piston 14 to its original position, he starts the handle 13 to the left which moves the valve piston 27 to the right until the garter spring 36 engages the groove 41 to retain the valve in the corresponding open position. Thereupon the motor piston is moved to the left by the pressure fluid, and the handle 13 returns to the left in synchronism with the motor piston until it encounters and is stopped by the other stop element 48, whereupon the final movement of the motor piston moves the valve piston back to neutral position against the resistance afforded by the garter spring 36, as previously described.

Final movement of the valve piston into exact center position by the centering spring 29 occurs after the motor has stopped, and moves the handle 13 slightly in reverse direction. The handle 13 therefore comes to rest slightly away from its stop, as shown in Fig. 1.

The range of movement of the motor piston 14 can be varied at either end by simply changing the positions of the stops 47 and 48 on the quadrant 49. In Fig. 2 these stops are shown adjusted closer together than in Fig. 1.

It is sometimes desirable with this type of equipment to be able to move the motor piston slowly under direct control of the handle 13, without utilizing the automatic hold and release features. Such movement can be effected by moving the handle very slightly out of neutral position, the movement being insufficient to carry either one of the grooves 40 or 41 in the valve piston into engagement by the garter spring 36. The grooves 40 and 41 are preferably so located that the valve begins to open before the garter spring 36 takes control. Therefore by effecting a slight pressure on the control handle 13 a slow movement of the motor piston 14 can be started, this initial movement of the handle 13 being opposed only by the centering spring 29 of the valve. The movement of the motor piston 14 tends to return the valve to neutral position, but by maintaining a slight force against the handle 13 the operator can cause the handle to follow the movement of the motor piston and maintain the slight opening of the valve necessary to maintain the motion. When he has moved the motor piston into the desired position, he halts it thereby simply releasing the handle 13.

In the event it is desired to have automatically controlled movement in only one direction, one of the grooves 40 or 41 can be eliminated. The motor piston 14 will then move in one direction only so long as force is maintained against the handle 13.

Although for the purpose of explaining the invention, a particular embodiment thereof has been shown and described, obvious modifications will occur to a person skilled in the art, and I

I claim:

1. A hydraulic control system comprising: a hydraulic motor having a driven element movable in response to flow of fluid to said motor; means including a valve for supplying operating fluid to said motor, said valve having a movable element having a neutral position and an open position; a control handle element freely movable through a range and a stop for stopping it at one end of said range; coupling means differentially coupling said three elements together whereby motion of any element applies forces to the other elements to move that one of the other two elements offering the least resistance to motion, said coupling means coupling said three elements in such sense that motion of the motor element resulting from said open position of the valve element urges the valve element toward neutral position and the handle element toward said stop; yieldable retaining means offering greater resistance to motion of said valve element out of open position than the resistance of said handle element during movement of the handle element by said motor element through said range, whereby movement of said motor element in response to open position of said valve first moves said handle element until it is stopped by said stop, and thereafter moves said valve element out of open position to stop said motor.

2. A system according to claim 1 in which said valve includes a restoring spring urging the movable element thereof into neutral position, said restoring spring being weaker than said yieldable retaining means.

3. A system according to claim 2 in which said valve movable element has a range of motion between neutral and open positions through which said valve is gradually opened, and said yieldable retaining means comprises a detent mechanism having effective holding force on said element only through an outer portion of said opening range, whereby said valve can be slightly opened by manipulation of said handle without engaging the detent mechanism, and closed by said restoring spring.

4. A system according to claim 1 in which said motor is reversible, said valve has forward and reverse open positions on opposite sides of said neutral position, and said handle has stops at opposite ends of said range of movement of said handle element.

ALVIN A. MEDDOCK.

REFERENCES CITED

The following references are of record in the file of this patent:

UNITED STATES PATENTS

| Number | Name | Date |
| --- | --- | --- |
| 2,511,393 | Worthington | June 13, 1950 |